(12) United States Patent
Sunagawa et al.

(10) Patent No.: US 6,818,351 B2
(45) Date of Patent: Nov. 16, 2004

(54) MIXED CATHODE ACTIVE MATERIAL FOR LITHIUM SECONDARY BATTERY

(75) Inventors: Takuya Sunagawa, Sumoto (JP); Masatoshi Takahashi, Itano-gun (JP); Yoshikumi Miyamoto, Tokushima (JP)

(73) Assignee: Sanyo Electric Co., Ltd., Osaka (JP)

( * ) Notice: Subject to any disclaimer, the term of this patent is extended or adjusted under 35 U.S.C. 154(b) by 175 days.

(21) Appl. No.: 10/079,590

(22) Filed: Feb. 22, 2002

(65) Prior Publication Data

US 2002/0164528 A1 Nov. 7, 2002

(30) Foreign Application Priority Data

Feb. 23, 2001 (JP) ..................................... P.2001-047891

(51) Int. Cl.[7] .............................................. H01M 4/58
(52) U.S. Cl. ................. 429/231.3; 329/224; 329/231.1; 329/231.95
(58) Field of Search .............................. 429/224, 231.1, 429/231.3, 231.95

(56) References Cited

U.S. PATENT DOCUMENTS 6,379,842 B1 * 4/2002 Mayer ..................... 429/231.3
6,482,550 B1 * 11/2002 Imachi et al. ............... 429/338
6,534,216 B1 * 3/2003 Narukawa et al. .......... 429/224
6,551,744 B1 * 4/2003 Ohzuku et al. ............. 429/223

FOREIGN PATENT DOCUMENTS

JP  4-171660  6/1992

* cited by examiner

Primary Examiner—Dah-Wei Yuan
(74) Attorney, Agent, or Firm—Nixon & Vanderhye P.C.

(57) ABSTRACT

A lithium secondary battery having improved load characteristics such as high rate discharge properties is obtained by using a mixed cathode active material comprising a mixture of lithium-containing manganese oxide having a spinel type crystal structure and lithium-containing cobalt oxide, wherein the cathode collector retains mixed cathode active material in such a manner that the mixing ratio of lithium cobaltate X thereof should fall in a range of $0.1 \leq X \leq 0.9$, that the bulk density Y (g/cm$^3$) of the cathode mixed agent should be confined in a range satisfying the relation of $0.5X+2.7 \leq Y \leq 0.6X+3.3$, and that the mean particle diameter of spinel type lithium manganate should be greater than the mean particle diameter of lithium cobaltate.

6 Claims, 5 Drawing Sheets

# MIXED CATHODE ACTIVE MATERIAL FOR LITHIUM SECONDARY BATTERY

BACKGROUND OF THE INVENTION

1. Field of the Invention

The present invention relates to a lithium secondary battery equipped with a cathode containing a cathode active material capable of intercalating and deintercalating lithium ions, an anode containing an anode active material capable of intercalating and deintercalating lithium ions, and a non-aqueous electrolyte, and it particularly relates to an improvement of the cathode active material.

2. Background Art

As lightweight and high capacity batteries for use in portable electronic and telecommunication devices and the like such as compact video cameras, cellular phones, and portable personal computers, recently put into practical use are lithium second batteries employing a carbon material capable of intercalating and deintercalating lithium ions as the anode active material and a lithium-containing transition metal oxide such as a lithium-containing cobalt oxide ($LiCoO_2$) or a lithium-containing nickel oxide ($LiNiO_2$) as the cathode active material.

However, although lithium-containing transition metal oxides such as lithium-containing cobalt oxide ($LiCoO_2$), lithium-containing nickel oxide ($LiNiO_2$), and the like possess a high battery capacity, they suffered a problem that they have low thermal stability in charged state; moreover, cobalt and nickel, which are the raw material, are expensive, and their reserve is limited. Accordingly, there is proposed a lithium secondary battery using a lithium-containing manganese oxide ($LiMn_2O_4$) having spinel type crystal structure as the cathode active material material. The lithium-containing manganese oxide ($LiMn_2O_4$) is one of the promising materials for use as the cathode active material material for a lithium secondary battery, in that manganese used for the raw material is abundant in resources and is inexpensive, and that it yields a high thermal stability in the charged state, such that it can increase the safety of the battery.

However, although the lithium-containing manganese oxide having the spinel type crystal structure ($LiMn_2O_4$: which is referred to hereinafter as "spinel type lithium manganate") has excellent thermal stability, it still had problems concerning the battery capacity and the charge-discharge cycle characteristics. More specifically, since a spinel type lithium manganate contracts on charging and expands on deintercalating, the electrode suffers a change in volume with progressive charge-discharge cycles. Accordingly, the active material particles undergo dissociation due to the change in volume, and this presumably causes a drop in collector efficiency. On the other hand, a lithium-containing cobalt oxide ($LiCoO_2$: which is referred to hereinafter as "lithium cobaltate") undergoes expansion on charging and contraction on deintercalating.

In the light of such circumstances, in Japanese Patent Laid-Open No. 171660/1992 is proposed to use a mixed cathode active material containing mixed therein a spinel type lithium manganate which contracts on charging and expands on deintercalating, and a lithium cobaltate which expands on charging and contracts on deintercalating.

By using a cathode comprising spinel type lithium manganate and lithium cobaltate in mixture, according to Japanese Patent Laid-Open No. 171660/1992, there can be realized a battery increased in capacity as compared with a case using spinel type lithium manganate alone, and a battery further improved in thermal stability as compared with a case using lithium cobaltate alone.

Concerning spinel type lithium manganate, the amount of intercalating and deintercalating lithium ions per unit mass, which is directly related to the battery capacity, is smaller than that of lithium cobaltate. Hence, in case of using a cathode material comprising spinel type lithium manganate and lithium cobaltate in mixture, there occurred a problem that the battery capacity is decreased as compared with the case using lithium cobaltate alone. Thus, measures on suppressing the drop in capacity has been considered by increasing the bulk density of the electrode retaining the active material of this type.

However, since lithium cobaltate consists of platy particles, the particles tend to show high orientation, and, in case the bulk density is increased, the lithium cobaltate particles become oriented in parallel with the collector. This leads not only to a decrease in the penetration of electrolyte, but also to a hindrance in maintaining the presence of crystallographic planes through which occlusion and discharge of lithium ions take place. Accordingly, lithium cobaltate suffered problems of decreasing load characteristics such as high rate discharge properties in case of increasing bulk density of the electrode.

SUMMARY OF THE INVENTION

The invention has been made with an aim to overcome the aforementioned problems, and an object thereof is to provide a lithium secondary battery, which, even in case a mixed cathode active material comprising mixed therein spinel type lithium manganate and lithium cobaltate is used, it still is capable of yielding improved load characteristics such as high rate discharge properties by optimizing, not only the bulk density of the cathode mixed agent, but also the mean particle diameter of both active materials, thereby suppressing the lithium cobaltate particles from being oriented.

DETAILED DESCRIPTION OF THE INVENTION

In order to achieve the object above, the cathode for use in the lithium secondary battery according to the invention comprises, retained on a cathode collector, a cathode mixed agent based on a mixed cathode active material comprising a mixture of lithium cobaltate and a spinel type lithium manganate, wherein the mixed cathode active material contains lithium cobaltate at a mass ratio X in a range of not lower than 0.1 but not higher than 0.9; the cathode mixed agent is retained on the cathode collector in such a manner that the bulk density Y (g/cm$^3$) should fall in a range not lower than 0.5X+2.7 but not higher than 0.6X+3.3; and the mean particle diameter of the spinel type lithium manganate is larger than the mean particle diameter of the lithium cobaltate. The bulk density Y for the cathode mixed agent herein signifies the mass of the mixed agent per unit volume of the cathode excluding the volume of the cathode collector.

Since spinel type lithium manganate is lower in electron conductivity as compared with lithium cobaltate, if the content of lithium cobaltate should be too low, the electron conductivity of the mixed cathode active material decreases as to lower the load characteristics such as the high rate discharge properties. On the other hand, if the amount of addition for spinel type lithium manganate should be too small, suppression on the orientation of lithium cobaltate particles results insufficient as to impair the load characteristics such as the high rate discharge properties. Accordingly, the mixed mass ratio of the spinel type lithium manganate is preferably set at 0.9 or lower but not lower than 0.1 (i.e., $0.1 \leq X \leq 0.9$, where X represents the mass ratio of spinel type lithium manganate).

In case the bulk density of the cathode mixed agent based on the mixed cathode active material of lithium cobaltate and spinel type lithium manganate (more specifically, the cathode mixed agent comprises a mixed cathode active material, an electrically conductive agent, and a binder) is too low, the load characteristics such as the high rate discharge properties decreases due to reduced electric contact among the active material particles present in the cathode mixed agent. In case the bulk density of the cathode mixed agent is too high, on the other hand, destruction occurs on the particles of the spinel type lithium manganate due to the excessively high pressure applied to the mixed cathode active material on forming an electrode by applying an extremely high pressure. This results in the decrease of the load characteristics such as the high rate discharge properties due to the failure of preventing the lithium cobaltate from being oriented. Accordingly, as a result of extensive experiments performed, it is found that the cathode mixed agent is preferably retained on the cathode collector in such a manner that the bulk density Y thereof should be set as such to satisfy the relation of $0.5X+2.7 \leq Y \leq 0.6X+3.3$.

In the case above, if the mean particle diameter of spinel type lithium manganate should be smaller than that of lithium cobaltate, it is found that lithium cobaltate particles tend to show an orientation in parallel with the collector when packed at a high bulk density. As a result, the crystallographic planes through which the occlusion and discharge of lithium ions take place become less present on the surface of the electrode, and the permeability of the electrolyte decreases. These lead to a decrease in the load characteristics such as the high rate discharge properties. Accordingly, the mean particle size of the spinel type lithium manganate should be set higher than the mean particle size of the lithium cobaltate. In this manner, the lithium cobaltate particles are suppressed from being oriented in parallel with the collector, thereby leading to an improved permeability of the electrolyte and to the improvement of load characteristics such as the high rate discharge properties.

Then, in case the ratio of the mean particle diameter (B/A) of the spinel type lithium manganate and the lithium cobaltate is in a range of $1.5 \leq B/A \leq 8.0$, the compressive force can be properly dispersed among the spinel type lithium manganate and the lithium cobaltate particles even in case a high compression is applied to realize high bulk density for the formation of the electrode. Thus, the orientation of lithium cobaltate particles can be suppressed as to improve the load characteristics such as the high rate discharge properties. More preferably, the load characteristics can be further improved in case the ratio is set in a range of $2.0 \leq B/A \leq 5.0$.

In case the mean particle diameter ratio of the spinel type lithium manganate and the lithium cobaltate (B/A) is fixed, a spinel type lithium manganate with a mean particle diameter smaller than 6 $\mu$m requires a higher compressive force in compressing the cathode mixed agent to a predetermined density, because the mean particle diameter for both spinel type lithium manganate and lithium cobaltate becomes smaller.

In this case, a further compressive force is applied to lithium cobaltate as a result, and this facilitates the orientation of lithium cobaltate particles as to lower the load characteristics such as the high rate discharge properties. On the other hand, spinel type lithium manganate with a mean particle diameter exceeding 40 $\mu$m increases the mean particle diameter of both spinel type lithium manganate and lithium cobaltate. Then, the surface area of the both particles decreases as to reduce the reaction area in contact with the electrolyte, thereby leading to a decrease in the load characteristics such as the high rate discharge properties. Accordingly, the mean particle diameter of spinel type lithium manganate B ($\mu$m) is confined, preferably, in a range of $6\ \mu m \leq B \leq 40\ \mu m$, and more preferably, in a range of $10\ \mu m \leq B \leq 30\ \mu m$.

Concerning the spinel type lithium manganate to employ in the invention, similar results are obtainable so long there is used such having a compositional formula of $Li_{1+X}Mn_{2-Y}M_2O_4$ (where M represents at least one type of element selected from the group consisting of B, Mg, Ca, Sr, Ba, Ti, V, Cr, Fe, Co, Ni, Cu, Al, In, Nb, Mo, W, Y, and Rh; $0.54 \leq ((1+X)+Z)/(2-Y) \leq 0.62$; $-0.15 \leq X \leq 0.15$; $Y \leq 0.5$; and $0 \leq Z \leq 0.1$). Among them, however, particularly superior high temperature characteristics (e.g., cycle life characteristics at high temperature, storage characteristics at high temperature, and the like) can be obtained by preferably employing those of Mg added systems or Al added systems.

As the lithium cobaltate to employ in the invention, similar results are obtainable so long there is used such expressed by a compositional formula of $LiCo_{1-X}M_XO_2$ (where M represents at least one type of element selected from the group consisting of B, Mg, Ca, Sr, Ba, Ti, V, Cr, Fe, Ni, Cu, Al, In, Nb, Mo, W, Y, and Rh, and $0 \leq X \leq 0.1$). Among them, however, particularly superior discharge characteristics are obtained by preferably using those of Cr added systems, Mn added systems, Al added systems, or Ti added systems.

DESCRIPTION OF THE PREFERRED EMBODIMENTS

Figure 1:
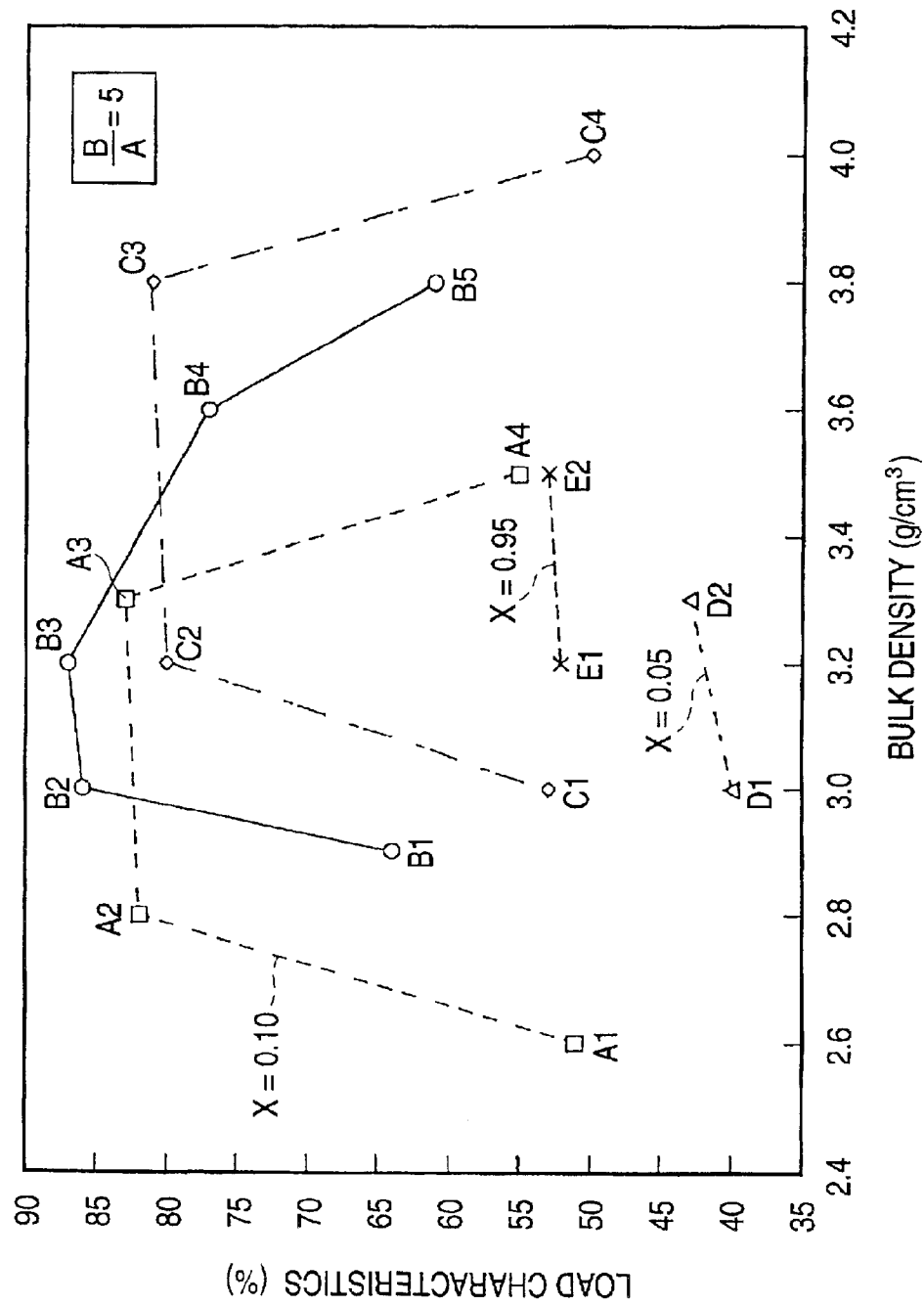
FIG. 1 shows a relation between the bulk density of a cathode mixed agent and the load characteristics in case the mean particle diameter ratio for spinel type lithium manganate and lithium cobaltate is set to a fixed value.

Preferred embodiments of the invention are described below.

1. Preparation of Mixed Cathode Active Material

First, as the cathode active material, a powder of lithium cobaltate ($LiCoO_2$) having a mean particle diameter of 4 $\mu$m (i.e., A=4 $\mu$m) and a powder of spinel type lithium manganate ($Li_{1.07}Mn_{1.09}Mg_{0.04}O_4$) having a mean particle diameter of 20 μm (i.e., B=20 μm) were each synthesized by methods known in the art. The mean particle diameter as referred herein signifies a size obtained as an average value of numerous secondary particles, which were collected by directly measuring the size of a secondary particle resulting from the coagulation of primary particles under SEM (scanning electron microscope) for each of the powders of active materials. In this case, the mean particle diameter ratio B/A for lithium cobaltate powder and spinel type lithium manganate powder is 5.0 (B/A=5).

Then, the lithium cobaltate powder and the lithium manganate powder were mixed at a predetermined mass ratio to obtain each of the mixed cathode active materials a, b, c, d, and e. In this case, the ratio of addition (mass ratio) of lithium cobaltate with respect to the resulting mixed cathode active material is defined as the mixing ratio, and the mixing ratio is expressed by X.

Thus were obtained a mixed cathode active material with a mixing ratio X of 0.1 (X=0.1) denoted as mixed cathode active material a, that with a mixing ratio X of 0.5 (X=0.5) denoted as mixed cathode active material b, that with a mixing ratio X of 0.9 (X=0.9) denoted as mixed cathode active material c, that with a mixing ratio X of 0.05 (X=0.05) denoted as mixed cathode active material d, and that with a mixing ratio X of 0.95 (X=0.95) denoted as mixed cathode active material e.

2. Preparation of Cathode

Eighty-five parts by mass each of the mixed cathode active materials a, b, c, d, and e was mixed individually with 10 parts by mass of carbon black used as an electrically conductive agent and 5 parts by mass of polyvinylidene fluoride (PVdF) used as the binder, to thereby obtain cathode mixed agents. Subsequently, the thus obtained cathode mixed agents were each mixed with N-methyl-2-pyrrolidone (NMP) to obtain a cathode slurry, and the resulting cathode slurry was applied to both sides of a cathode collector (an aluminum foil or an aluminum alloy foil) having a thickness of 20 μm to thereby form a cathode mixed agent layers on both sides of the cathode collector. After drying the slurry, the layers were rolled to a predetermined bulk density by using a rolling roll, and the resulting product was cut into a predetermined size (e.g., at a width of 40 mm and a length of 280 mm) to obtain a cathode.

Then, by using the mixed cathode active material a, there were prepared cathode a1 having a bulk density of 2.6 g/cm³, cathode a2 having a bulk density of 2.8 g/cm³, cathode a3 having a bulk density of 3.3 g/cm³, and cathode a4 having a bulk density of 3.5 g/cm³. Further, by using the mixed cathode active material b, there were prepared cathode b1 having a bulk density of 2.9 g/cm³, cathode b2 having a bulk density of 3.0 g/cm³, cathode b3 having a bulk density of 3.2 g/cm³, cathode b4 having a bulk density of 3.6 g/cm³, and cathode b5 having a bulk density of 3.8 g/cm³.

Furthermore, by using the mixed cathode active material c, there were prepared cathode c1 having a bulk density of 3.0 g/cm³, cathode c2 having a bulk density of 3.2 g/cm³, cathode c3 having a bulk density of 3.8 g/cm³, and cathode c4 having a bulk density of 4.0 g/cm³. Further, by using the mixed cathode active material d, there were prepared cathode d1 having a bulk density of 3.0 g/cm³, and cathode d2 having a bulk density of 3.3 g/cm³. Finally, by using the mixed cathode active material e, there were prepared cathode e1 having a bulk density of 3.2 g/cm³, and cathode e2 having a bulk density of 3.5 g/cm³.

3. Preparation of Anode

Ninety-five parts by mass of natural graphite was mixed with 5 parts by mass of polyvinylidene fluoride (PVdF) powder used as a binder, and the resulting mixture was further mixed with N-methyl-2-pyrrolidone (NMP) to obtain anode slurry. Then, the anode slurry thus obtained was applied to both sides of a 18 μm thick anode collector (copper foil) by means of doctor blade method to form active material layers on both sides of the anode collector. After drying, the layers were rolled to a predetermined thickness by using a rolling roll, and the resulting product was cut into a predetermined size (e.g., 42 mm in width and 300 mm in length) to obtain the anode.

As the anode active material, there can be used, in addition to natural graphite, other carbon based materials such as carbon black, coke, glassy carbon, carbon fibers, and the sintered bodies thereof; otherwise, there can be used lithium or an alloy based on lithium, and amorphous oxides and other materials capable of intercalating and deintercalating lithium ions and known in the art.

4. Production of Lithium Secondary Battery

Thereafter, each of the cathodes a1, a2, a3, a4, b1, b2, b3, b4, b5, c1, c2, c3, c4, d1, d2, e1, and e2 was used together with anodes prepared above, and after laminating them with a porous membrane separator interposed between them, the resulting product was wound into a coil to obtain a wound group of electrodes. After inserting the group of electrodes into a cylindrical metal outer casing, the collector tab extended out from each of the collectors was welded to each of the terminals, and a non-aqueous electrolyte containing 1 mol/liter of $LiPF_6$ dissolved in an equi-volume mixed solvent of ethylene carbonate (EC) and diethyl carbonate (DEC) was injected. Then, after attaching a cathode lid to the aperture portion of the outer casing with an insulator packing interposed between them, the aperture was sealed to produce each of the lithium secondary batteries A1, A2, A3, A4, B1, B2, B3, B4, B5, C1, C2, C3, C4, D1, D2, E1, and E2.

The lithium secondary batteries using cathodes a1, a2, a3, and a4 were each denoted as lithium secondary batteries A1, A2, A3, and A4, respectively. The lithium secondary batteries using cathodes b1, b2, b3, b4, and b5 were each denoted as lithium secondary batteries B1, B2, B3, B4, and B5, respectively. The lithium secondary batteries using the cathodes c1, c2, c3, and c4 were each denoted as lithium secondary batteries C1, C2, C3, and C4, respectively. Furthermore, the lithium secondary batteries using cathodes d1 and d2 were denoted as lithium secondary batteries D1 and D2, respectively, and the lithium secondary battery using e1 and e2 were denoted as lithium secondary batteries E1 and E2, respectively.

As the mixed solvent other than the mixture of ethylene carbonate (EC) and diethyl carbonate (DEC) above, there can be mentioned an aprotic solvent having no ability of supplying hydrogen ions; for instance, there can be used an organic solvent such as propylene carbonate (PC), vinylene carbonate (VC), butylene carbonate (BC), and y-butyrolactone (GBL), or a mixed solvent obtained by mixing them with a low boiling point solvent such as dimethyl carbonate (DMC), methyl ethyl carbonate (EMC), 1,2-diethoxyethane (DEE), 1,2-dimethoxyethane (DME), and ethoxymethoxyethane (EME). Furthermore, as the solute to be dissolved in the solvents above, in addition to $LiPF_6$, there can be mentioned, $LiBF_4$, $LiCF_3SO_3$, $LiAsF_6$, $LiN(CF_3SO_2)_3$, $LiC(CF_3SO_2)_3$, and $LiCF_3(CF_2)_3SO_3$. In addition, there can be used, for example, a polymer electrolyte, a gel electrolyte comprising a polymer impregnated with a non-aqueous electrolyte, or a solid electrolyte.

5. Charge-discharge Test of Lithium Secondary Battery

Each of the batteries A1, A2, A3, A4, B1, B2, B3, B4, B5, C1, C2, C3, C4, D1, D2, E1, and E2 was charged at a constant charge current of 60 mA under room temperature (ca. 25° C.) until the battery voltage reached 4.2 V, and was then allowed to discharge at a discharge current of 600 mA to a battery voltage of 3.1 V to obtain the discharge capacity α (mAh) from the discharge time. Then, by maintaining the charge current at a constant value of 60 mA, charging was performed until the battery voltage reached 4.2 V, and high rate deintercalating was performed thereafter at a discharge current of 1800 mA until the battery voltage reached 3.1 V. Thus was obtained the discharge capacity β (mAh) from the discharge time. Then, the load characteristic was obtained by calculating the discharge capacity ratio β/α (%). The results are shown in Table 1.

TABLE 1

| Type of battery | Details of mixed cathode active material | | | Load characteristics (%) |
| --- | --- | --- | --- | --- |
| | Mixing ratio (X) | Bulk density (g/cm$^3$) | Particle diameter ratio | |
| A1 | 0.10 | 2.6 | 5.0 | 51 |
| A2 | 0.10 | 2.8 | 5.0 | 82 |
| A3 | 0.10 | 3.3 | 5.0 | 83 |
| A4 | 0.10 | 3.5 | 5.0 | 55 |
| B1 | 0.50 | 2.9 | 5.0 | 64 |
| B2 | 0.50 | 3.0 | 5.0 | 86 |
| B3 | 0.50 | 3.2 | 5.0 | 87 |
| B4 | 0.50 | 3.6 | 5.0 | 77 |
| B5 | 0.50 | 3.8 | 5.0 | 61 |
| C1 | 0.90 | 3.0 | 5.0 | 53 |
| C2 | 0.90 | 3.2 | 5.0 | 80 |
| C3 | 0.90 | 3.8 | 5.0 | 81 |
| C4 | 0.90 | 4.0 | 5.0 | 50 |
| D1 | 0.05 | 3.0 | 5.0 | 40 |
| D2 | 0.05 | 3.3 | 5.0 | 43 |
| E1 | 0.95 | 3.2 | 5.0 | 52 |
| E2 | 0.95 | 3.5 | 5.0 | 53 |

From the results given in Table 1, a graph as shown in FIG. 1 was obtained by taking the bulk density (g/cm$^3$) of the cathode mixed agent as the abscissa and the load characteristics (%) as the ordinate. From the results shown in FIG. 1, it can be clearly understood that, in case the mean particle diameter ratio (B/A) of lithium cobaltate and spinel type lithium manganate is set to 5 (i.e., B/A=5), the load characteristics change with changing bulk density of the cathode mixed agent, and that the optimal range of bulk density of the cathode mixed agent changes in accordance with the mixed ratio X of lithium cobaltate (i.e., the amount of addition of lithium cobaltate (mass ratio) with respect to the mixed cathode active material).

Figure 2:
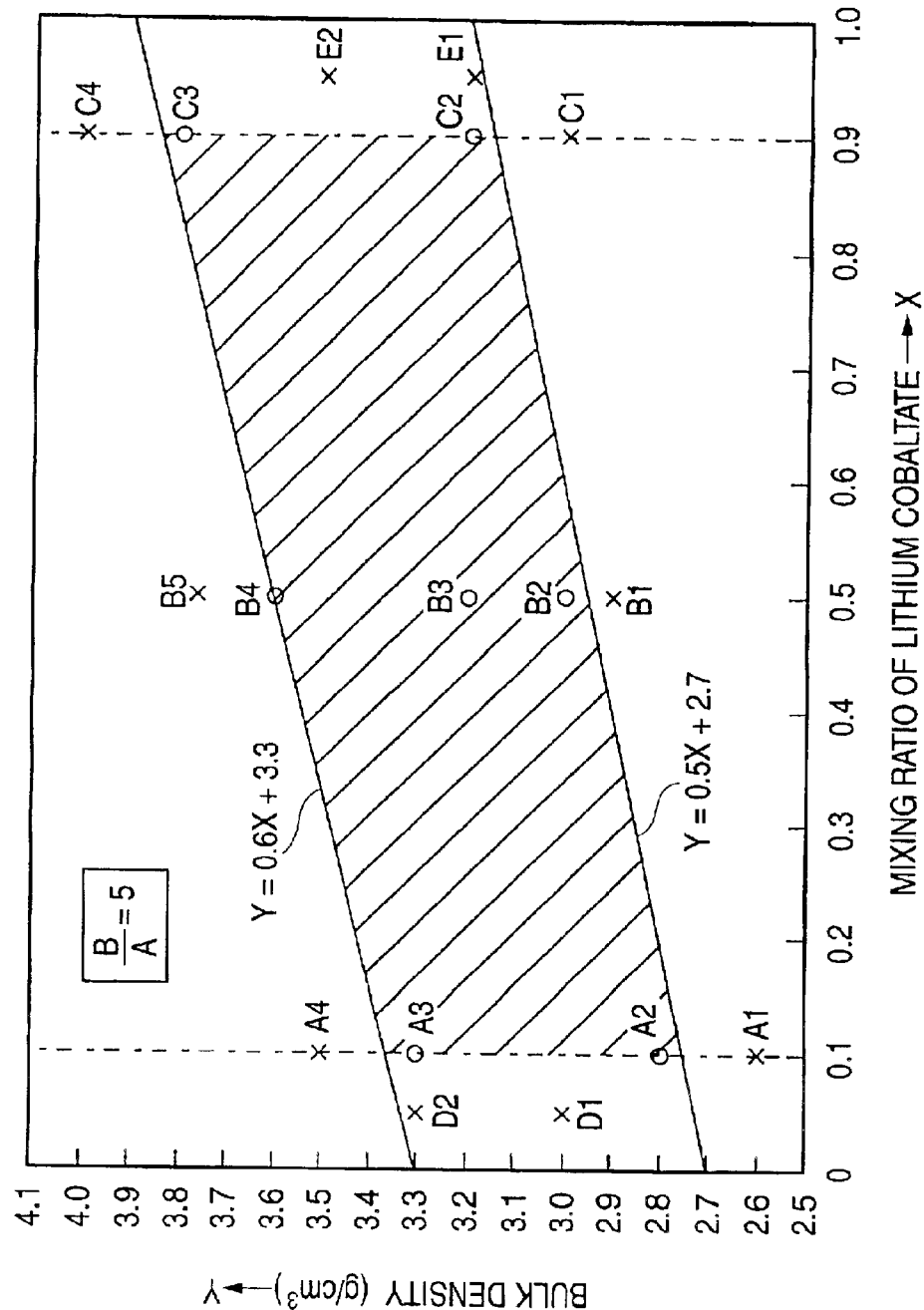
FIG. 2 shows a relation between the mixing ratio of lithium cobaltate and the bulk density of a cathode mixed agent.

Then, on plotting the results shown in Table 1 by taking the mixing ratio of lithium cobaltate as the abscissa (X axis) and the bulk density of the cathode mixed agent as the ordinate (Y axis), FIG. 2 was obtained. In FIG. 2, lithium secondary batteries A2, A3, B2, B3, B4, C2, and C3 showing load characteristics of 75% or higher in FIG. 1 are plotted with open circles, and the lithium secondary batteries A1, A4, B1, B5, C1, C4, D2, E1, and E2 showing load characteristics lower than 75% are plotted by crosses. Referring to FIG. 2, a lower limit line expressed by Y=0.5X+2.7 was obtained to separate the open circles from the crosses, and an upper limit line expressed by Y=0.6X+3.3 was obtained to separate the open circles from the crosses.

From the results obtained in FIG. 2, the following can be clearly observed. Specifically, a lithium secondary battery having excellent load characteristics can be obtained in case the mixing ratio X of lithium cobaltate is in a range of 0.1 or higher but not higher than 0.9 (0.1≦X≦0.9), and falling in a range defined between a straight line expressed by Y=0.5X+2.7 and Y=0.6X+3.3 inclusive of the lines (0.5X+2.7≦Y≦0.6X+3.3); that is, a lithium secondary battery having excellent load characteristics in case the mixing ratio of lithium cobaltate and the bulk density of the cathode mixed agent fall within the hatched area shown in FIG. 2. From the findings above, it can be understood that the mixing ratio of lithium cobaltate X should be confined in a range of 0.1 or higher but not higher than 0.9, and that the bulk density Y (g/cm$^3$) of the cathode mixed agent should be confined in a range satisfying the relation of 0.5X+2.7≦Y≦0.6X+3.3.

Since spinel type lithium manganate is lower than lithium cobaltate in electron conductivity, the drop in load characteristics occurs presumably due to the decrease in electron conductivity of the mixed cathode active material in case the mixing ratio of lithium cobaltate X falls lower than 0.1. Further, in case the mixing ratio of lithium cobaltate X exceeds 0.9, the amount of addition of spinel type lithium manganate becomes too low that spinel type lithium manganate can no longer suppress lithium cobaltate from being oriented, thereby leading to a drop in load characteristics attributed to the decrease in occlusion and discharge of lithium ions.

Furthermore, in case the bulk density becomes lower than 0.5X+2.7, the electric contact of the active material particles with each other decreases as to cause a drop in load characteristics. On the other hand, in case the bulk density exceeds 0.6X+3.3, load characteristics decreases due to the excessively high pressure applied to the mixed cathode active material on forming an electrode by applying an extremely high pressure, because destruction occurs on the particles of the spinel type lithium manganate, and because lithium cobaltate particles become oriented at the same time.

6. Study on the Relation between the Bulk Density and Load Characteristics with Changing Particle Diameter Ratio In the example above, study has been made on the relation between the bulk density of the cathode mixed agent and the load characteristics with changing mixing ratio of lithium cobaltate X, while fixing the mean particle diameter ratio of spinel type lithium manganate and lithium cobaltate to 5. In the following, the relation between the bulk density and load characteristics with changing mean particle diameter ratio (B/A) of the spinel type lithium manganate and lithium cobaltate was studied while fixing the mixing ratio of lithium cobaltate X to 0.5.

Lithium cobaltate powder (consisting of particles yielding mean particle diameter A of 10 μm) and spinel type lithium manganate powder (consisting of particles yielding mean particle diameter B of 20 μm), which yield a mean particle diameter ratio for spinel type lithium manganate and lithium cobaltate of 2 (B/A=2), were mixed as such that the mixing ratio of lithium cobaltate powder X should become 0.5 to obtain a mixed cathode active material f.

Similarly, by using lithium cobaltate powder (consisting of particles yielding mean particle diameter A of 20 μm) and spinel type lithium manganate powder (consisting of particles yielding mean particle diameter B of 20 μm), which yield a mean particle diameter ratio of 1 (B/A=1), a mixed cathode active material g was obtained by mixing them in such a manner that the mixing ratio of lithium cobaltate powder X should become 0.5.

Further similarly, by using lithium cobaltate powder (consisting of particles yielding mean particle diameter A of 30 μm) and spinel type lithium manganate powder (consisting of particles yielding mean particle diameter B of 20 μm), which yield a mean particle diameter ratio of 0.67 (B/A=0.67), a mixed cathode active material h was obtained by mixing them in such a manner that the mixing ratio of lithium cobaltate powder X should become 0.5.

Subsequently, cathode slurries were each prepared in the same manner as above by using the mixed cathode active materials f, g, and h thus obtained, and the cathode slurries were each applied to both sides of a cathode collector (an aluminum foil or an aluminum alloy foil) to form cathode mixed agent layers. After drying the thus obtained layers, they were each rolled and cut into predetermined size to obtain cathodes. Further, by using the mixed cathode active material f, there were prepared cathode f1 having a bulk density of 2.9 g/cm³, cathode f2 having a bulk density of 3.0 g/cm³, cathode f3 having a bulk density of 3.2 g/cm³, cathode f4 having a bulk density of 3.6 g/cm³, and cathode f5 having a bulk density of 3.8 g/cm³.

Furthermore, by using the mixed cathode active material g, there were prepared cathode g1 having a bulk density of 2.9 g/cm³, cathode g2 having a bulk density of 3.0 g/cm³, cathode g3 having a bulk density of 3.2 g/cm³, cathode g4 having a bulk density of 3.6 g/cm³, and cathode g5 having a bulk density of 3.8 g/cm³. Additionally, by using the mixed cathode active material h, there were prepared cathode h1 having a bulk density of 2.9 g/cm³, cathode h2 having a bulk density of 3.0 g/cm³, cathode h3 having a bulk density of 3.2 g/cm³, cathode h4 having a bulk density of 3.6 g/cm³, and cathode h5 having a bulk density of 3.8 g/cm³.

Subsequently, by using each of the cathodes prepared above and in a manner similar to that described above, there were prepared each of lithium secondary batteries F1 (using cathode f1), F2 (using cathode f2), F3 (using cathode f3), F4 (using cathode f4), F5 (using cathode f5), G1 (using cathode g1), G2 (using cathode g2), G3 (using cathode g3), G4 (using cathode g4), G5 (using cathode g5), H1 (using cathode h1), H2 (using cathode h2), H3 (using cathode h3), H4 (using cathode h4), and H5 (using cathode h5).

Then, in a manner similar to above, each of the lithium secondary batteries was charged at room temperature (ca. 25° C.) at constant charge current of 60 mA until a battery voltage of 4.2 V is reached, and was discharged at a discharge current of 600 mA to a battery voltage of 3.1 V to obtain the discharge capacity α (mAh) from the discharge time. Then, by maintaining the charge current at a constant value of 60 mA, charging was performed until the battery voltage reached 4.2 V, and high rate deintercalating was performed thereafter at a discharge current of 1800 mA until the battery voltage reached 3.1 V. Thus was obtained the discharge capacity β (mAh) from the discharge time. Then, the load characteristic was obtained by calculating the discharge capacity ratio β/α (%). The results are shown in Table 2.

TABLE 2

| | Details of mixed cathode active material | | | | | |
|---|---|---|---|---|---|---|
| Type of battery | Mixing ratio (X) | Bulk density (g/cm³) | Particle diameter A (μm) | Particle diameter B (μm) | Particle diameter ratio (B/A) | Load characteristics (%) |
| F1 | 0.5 | 2.9 | 10 | 20 | 2.0 | 62 |
| F2 | 0.5 | 3.0 | 10 | 20 | 2.0 | 83 |
| F3 | 0.5 | 3.2 | 10 | 20 | 2.0 | 83 |
| F4 | 0.5 | 3.6 | 10 | 20 | 2.0 | 75 |
| F5 | 0.5 | 3.8 | 10 | 20 | 2.0 | 60 |
| G1 | 0.5 | 2.9 | 20 | 20 | 1.0 | 51 |
| G2 | 0.5 | 3.0 | 20 | 20 | 1.0 | 61 |
| G3 | 0.5 | 3.2 | 20 | 20 | 1.0 | 62 |
| G4 | 0.5 | 3.6 | 20 | 20 | 1.0 | 56 |
| G5 | 0.5 | 3.8 | 20 | 20 | 1.0 | 49 |
| H1 | 0.5 | 2.9 | 30 | 20 | 0.67 | 42 |
| H2 | 0.5 | 3.0 | 30 | 20 | 0.67 | 50 |
| H3 | 0.5 | 3.2 | 30 | 20 | 0.67 | 51 |
| H4 | 0.5 | 3.6 | 30 | 20 | 0.67 | 46 |
| H5 | 0.5 | 3.8 | 30 | 20 | 0.67 | 41 |

Figure 3:
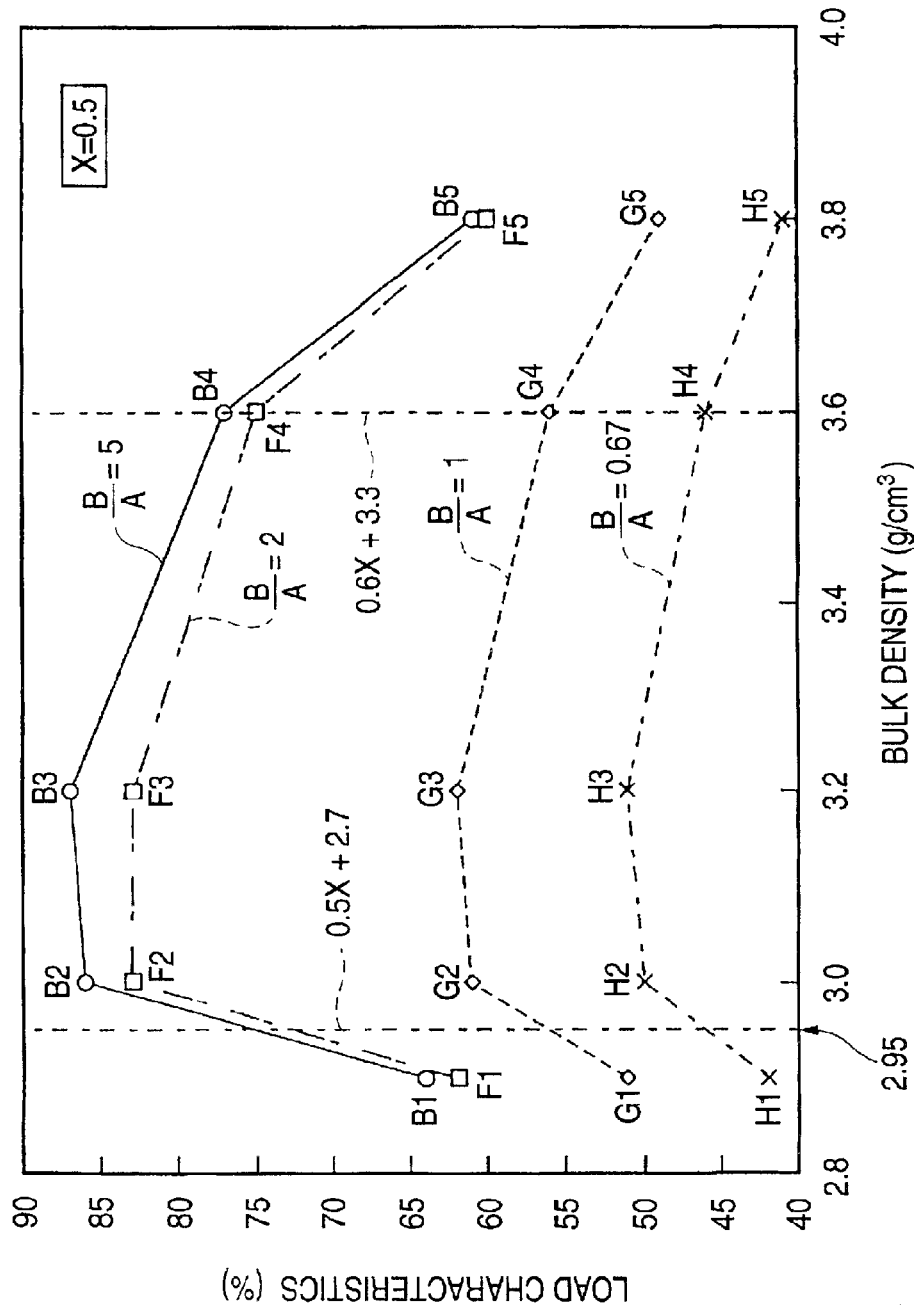
FIG. 3 shows a relation between the bulk density of a cathode mixed agent and the load characteristics in case the mixing ratio of lithium cobaltate is set to a value of 0.5.

From the results given in Table 2, a graph as shown in FIG. 3 was obtained by taking the bulk density (g/cm³) as the abscissa and the load characteristics (%) as the ordinate. In FIG. 3 are also shown the results obtained on the lithium secondary batteries B1, B2, B3, B4, and B5 obtained above.

From the results shown in FIG. 3, it can be clearly understood that, in case the mixing ratio of lithium cobaltate X is fixed to 5, the load characteristics decrease with decreasing mean particle diameter ratio (B/A) of lithium cobaltate and spinel type lithium manganate from 5.0, 2.0, 1.0, and 0.67. Furthermore, it can be understood that an optimal range bulk density is present even in case the mean particle diameter ratio (B/A) is changed.

Furthermore, it can be understood that excellent load characteristics can be obtained in case the packing density Y is set to 2.95 (0.5X+2.7=0.5×0.5+2.7 =2.95) or higher but not higher than 3.6 (0.6X+3.3 =0.6×0.5+3.3=3.6), and in case the mean particle diameter ratio of lithium cobaltate powder and spinel type lithium manganate powder (B/A) is greater than 1. Thus, it can be concluded that the bulk density Y of the cathode mixed agent is set in a range expressed by 0.5X+2.7≦Y≦0.6X+3.3, and that the mean particle diameter ratio of lithium cobaltate powder and spinel type lithium manganate powder (B/A) is set greater than 1.

7. Study on the Relation between Mean Particle Diameter Ratio and Load Characteristics In the example above, study has been made on the relation between the bulk density of the cathode mixed agent and the load characteristics with changing the mean particle diameter ratio of spinel type lithium manganate and lithium cobaltate while fixing the mixing ratio of lithium cobaltate X to 0.5. In the following, the relation between the mean particle diameter ratio (B/A) of the spinel type lithium manganate and lithium cobaltate and load characteristics is studied while fixing the mixing ratio of lithium cobaltate X to 0.5 and the bulk density of the cathode mixed agent to 3.2 g/cm³.

Lithium cobaltate powder (consisting of particles yielding mean particle diameter A of 16 μm) and spinel type lithium manganate powder (consisting of particles yielding mean particle diameter B of 20 μm), which yield a mean particle diameter ratio for spinel type lithium manganate and lithium cobaltate of 1.25 (B/A=1.25), were mixed as such that the mixing ratio of lithium cobaltate powder X should become 0.5 to obtain a mixed cathode active material i.

Similarly, by using lithium cobaltate powder (consisting of particles yielding mean particle diameter A of 13 μm) and spinel type lithium manganate powder (consisting of particles yielding mean particle diameter B of 20 μm), which yield a mean particle diameter ratio of 1.54 (B/A=1.54), a mixed cathode active material j was obtained by mixing them in such a manner that the mixing ratio of lithium cobaltate powder X should become 0.5.

Furthermore, by using lithium cobaltate powder (consisting of particles yielding mean particle diameter A of 2.5 μm) and spinel type lithium manganate powder (consisting of particles yielding mean particle diameter B of 20 μm), which yield a mean particle diameter ratio of 8.0 (B/A=8.0), a mixed cathode active material k was obtained by mixing them in such a manner that the mixing ratio of lithium cobaltate powder X should become 0.5.

Additionally, by using lithium cobaltate powder (consisting of particles yielding mean particle diameter A of 2 μm) and spinel type lithium manganate powder (consisting of particles yielding mean particle diameter B of 20 μm), which yield a mean particle diameter ratio of 10 (B/A=10), a mixed cathode active material l was obtained by mixing them in such a manner that the mixing ratio of lithium cobaltate powder X should become 0.5.

Then, cathode slurries were each prepared in the same manner as above by using the mixed cathode active materials i, j, k, and l thus obtained, and the cathode slurries were each applied to both sides of a cathode collector (an aluminum foil or an aluminum alloy foil) to form cathode mixed agent layers. After drying the thus obtained layers, they were each rolled and cut into predetermined size to obtain cathodes. Thus, by using the mixed cathode active material i, there was prepared cathode i3 having a bulk density of 3.2 g/cm³. Similarly, cathode j3 was prepared by using mixed cathode active material j at bulk density of 3.2 g/cm³, cathode k3 was prepared by using mixed cathode active material k at bulk density of 3.2 g/cm³, and cathode l3 was prepared by using mixed cathode active material l at bulk density of 3.2 g/cm³.

Subsequently, by using each of the cathodes prepared above and in a manner similar to that described above, there were prepared each of lithium secondary batteries I3 (using cathode i3), J3 (using cathode j3), K3 (using cathode k3), and L3 (using cathode l3) Then, in a manner similar to above, each of the lithium secondary batteries was charged at room temperature (ca. 25° C.) at constant charge current of 60 mA until a battery voltage of 4.2 V is reached, and was discharged at a discharge current of 600 mA to a battery voltage of 3.1 V to obtain the discharge capacity α (mAh) from the discharge time. Then, by maintaining the charge current at a constant value of 60 mA, charging was performed until the battery voltage reached 4.2 V, and high rate deintercalating was performed thereafter at a discharge current of 1800 mA until the battery voltage reached 3.1 V. Thus was obtained the discharge capacity β (mAh) from the discharge time. Then, the charge characteristic was obtained by calculating the discharge capacity ratio β/α (%). The results are shown in Table 3. In Table 3 are given the results obtained on lithium secondary batteries B3, F3, G3, and H3 obtained above.

TABLE 3

| Type of battery | Details of mixed cathode active materials | | | | | Load characteristics (%) |
| --- | --- | --- | --- | --- | --- | --- |
| | Mixing ratio (X) | Bulk density (g/cm³) | Particle diameter A (μm) | Particle diameter B (μm) | Particle diameter ratio (B/A) | |
| H3 | 0.50 | 3.2 | 30 | 20 | 0.67 | 51 |
| G3 | 0.50 | 3.2 | 20 | 20 | 1.0 | 62 |
| I3 | 0.50 | 3.2 | 16 | 20 | 1.25 | 68 |
| J3 | 0.50 | 3.2 | 13 | 20 | 1.54 | 75 |
| F3 | 0.50 | 3.2 | 10 | 20 | 2.0 | 83 |
| B3 | 0.50 | 3.2 | 4 | 20 | 5.0 | 87 |
| K3 | 0.50 | 3.2 | 2.5 | 20 | 8.0 | 75 |
| L3 | 0.50 | 3.2 | 2 | 20 | 10 | 67 |

Figure 4:
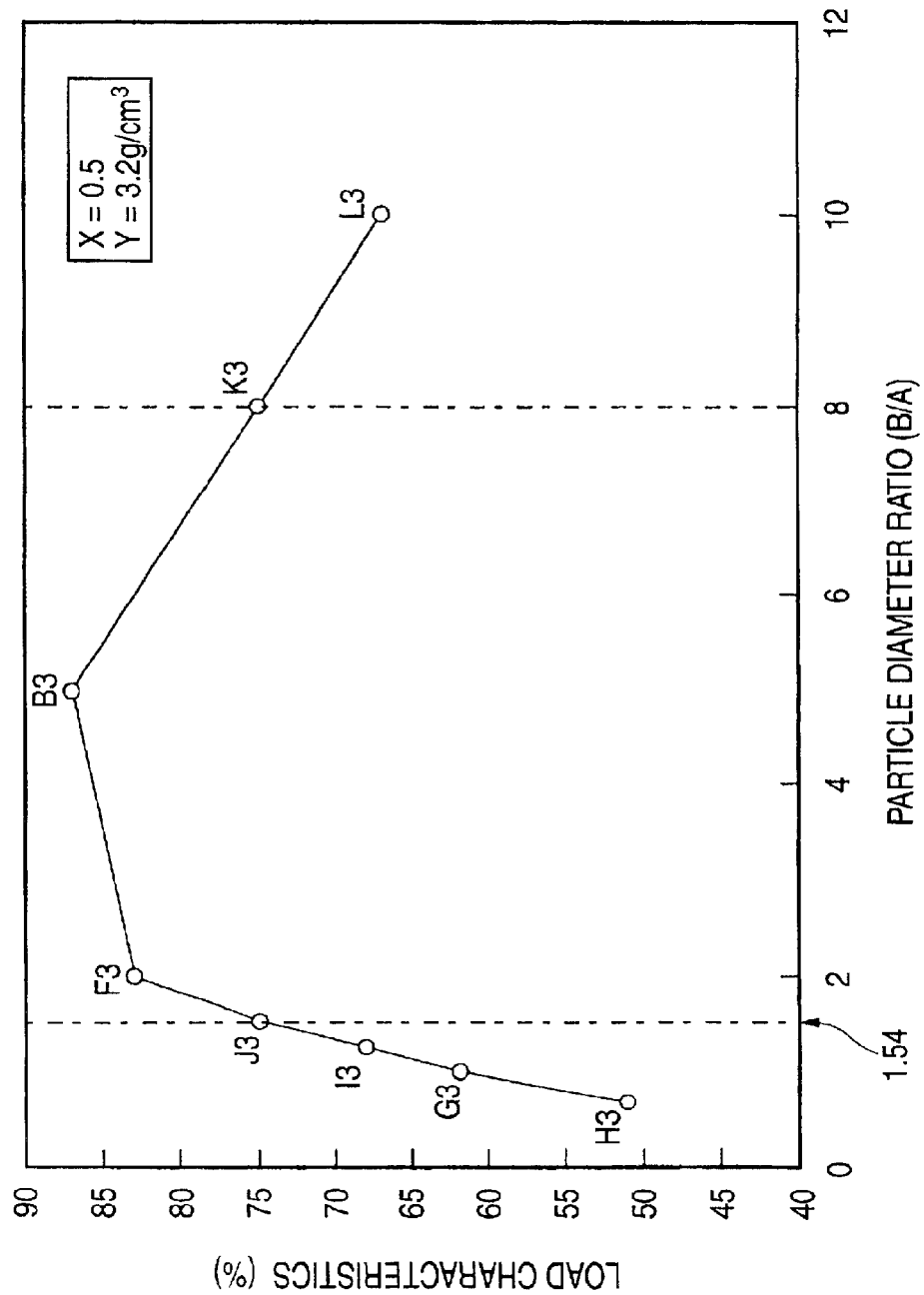
FIG. 4 shows a relation between the mean particle diameter ratio for spinel type lithium manganate and lithium cobaltate and the load characteristics, in case the mixing ratio of lithium cobaltate is set to a value of 0.5 and the bulk density of a cathode mixed agent is set to 3.2 g/cm$^3$.

From the results given in Table 3, a graph as shown in FIG. 4 was obtained by taking the mean particle diameter ratio (B/A) of spinel type lithium manganate and lithium cobaltate as the abscissa and the load characteristics (%) as the ordinate. From the results shown in FIG. 4, it can be clearly understood that the load characteristics is improved in case the mean particle diameter ratio (B/A) of lithium cobaltate and spinel type lithium manganate falls in a range of $1.5 \leq B/A \leq 8$, and that the load characteristics is further improved in case the mean particle diameter ratio (B/A) of lithium cobaltate and spinel type lithium manganate falls in a range of $2 \leq B/A \leq 5$.

The result above is presumably due to the fact that the compressive force can be properly dispersed among the spinel type lithium manganate and the lithium cobaltate particles even in case a high compression is applied to realize high bulk density for the formation of the electrode. Thus, the orientation of lithium cobaltate particles can be suppressed as to improve the load characteristics such as the high rate discharge properties.

8. Study on the Mean Particle Diameter of Lithium Cobaltate

In the example above, study has been made on the relation between the mean particle diameter ratio of spinel type lithium manganate and lithium cobaltate and the load characteristic while fixing the mixing ratio of lithium cobaltate X to 0.5 and the bulk density of the cathode mixed agent to 3.2 g/cm³. However, in the following, the relation between the mean particle diameter of lithium cobaltate and the load characteristics was studied while fixing the mixing ratio of lithium cobaltate X to 0.5 and the bulk density of the cathode mixed agent to 3.2 g/cm³ and while further fixing the mean particle diameter ratio of spinel type lithium manganate and lithium cobaltate to 2 (B/A=2).

Lithium cobaltate powder (consisting of particles yielding mean particle diameter A of 3 μm) and spinel type lithium manganate powder (consisting of particles yielding mean particle diameter B of 6 μm), which yield a mean particle diameter ratio of 2, were mixed as such that the mixing ratio of lithium cobaltate powder X should become 0.5 to obtain a mixed cathode active material m.

Similarly, by using lithium cobaltate powder (consisting of particles yielding mean particle diameter A of 5 μm) and spinel type lithium manganate powder (consisting of particles yielding mean particle diameter B of 10 μm), which yield a mean particle diameter ratio of 2, a mixed cathode active material n was obtained by mixing them in such a manner that the mixing ratio of lithium cobaltate powder X should become 0.5.

Furthermore, by using lithium cobaltate powder (consisting of particles yielding mean particle diameter A of 15 μm) and spinel type lithium manganate powder (consisting of particles yielding mean particle diameter B of 30 μm), which yield a mean particle diameter ratio of 2, a mixed cathode active material o was obtained by mixing them in such a manner that the mixing ratio of lithium cobaltate powder X should become 0.5.

Additionally, by using lithium cobaltate powder (consisting of particles yielding mean particle diameter A of 20 μm) and spinel type lithium manganate powder (consisting of particles yielding mean particle diameter B of 40 μm), which yield a mean particle diameter ratio of 2, a mixed cathode active material p was obtained by mixing them in such a manner that the mixing ratio of lithium cobaltate powder X should become 0.5.

Then, cathode slurries were each prepared in the same manner as above by using the mixed cathode active materials m, n, o, and p thus obtained, and the cathode slurries were each applied to both sides of a cathode collector (an aluminum foil or an aluminum alloy foil) to form cathode mixed agent layers. After drying the thus obtained layers, they were each rolled and cut into predetermined size to obtain cathodes. Thus, by using the mixed cathode active material m, there was prepared cathode m3 having a bulk density of 3.2 g/cm³. Similarly, cathode n3 was prepared by using mixed cathode active material n at bulk density of 3.2 g/cm³, cathode o3 was prepared by using mixed cathode active material o at bulk density of 3.2 g/cm³, and cathode p3 was prepared by using mixed cathode active material p at bulk density of 3.2 g/cm³.

Subsequently, by using each of the cathodes prepared above and in a manner similar to that described above, there were prepared each of lithium secondary batteries M3 (using cathode m3), N3 (using cathode n3) O3 (using cathode o3), and P3 (using cathode p3). Then, in a manner similar to above, each of the lithium secondary batteries was charged at room temperature (ca. 25° C.) at constant charge current of 60 mA until a battery voltage of 4.2 V is reached, and was discharged at a discharge current of 600 mA to a battery voltage of 3.1 V to obtain the discharge capacity α (mAh) from the discharge time. Then, by maintaining the charge current at a constant value of 60 mA, charging was performed until the battery voltage reached 4.2 V, and high rate deintercalating was performed thereafter at a discharge current of 1800 mA until the battery voltage reached 3.1 V. Thus was obtained the discharge capacity β (mAh) from the discharge time. Then, the charge characteristic was obtained by calculating the discharge capacity ratio β/α (%) The results are shown in Table 3. In Table 3 is also given the result obtained on lithium secondary battery F3 obtained above.

TABLE 4

| Type of battery | Details of mixed cathode active material | | | | | Load characteristics (%) |
|---|---|---|---|---|---|---|
| | Mixing ratio (X) | Bulk density (g/cm³) | Particle diameter A (μm) | Particle diameter B (μm) | Particle diameter ratio (B/A) | |
| M3 | 0.50 | 3.2 | 3 | 6 | 2.0 | 76 |
| N3 | 0.50 | 3.2 | 5 | 10 | 2.0 | 82 |
| F3 | 0.50 | 3.2 | 10 | 20 | 2.0 | 83 |
| O3 | 0.50 | 3.2 | 15 | 30 | 2.0 | 80 |
| P3 | 0.50 | 3.2 | 20 | 40 | 2.0 | 75 |

Figure 5:
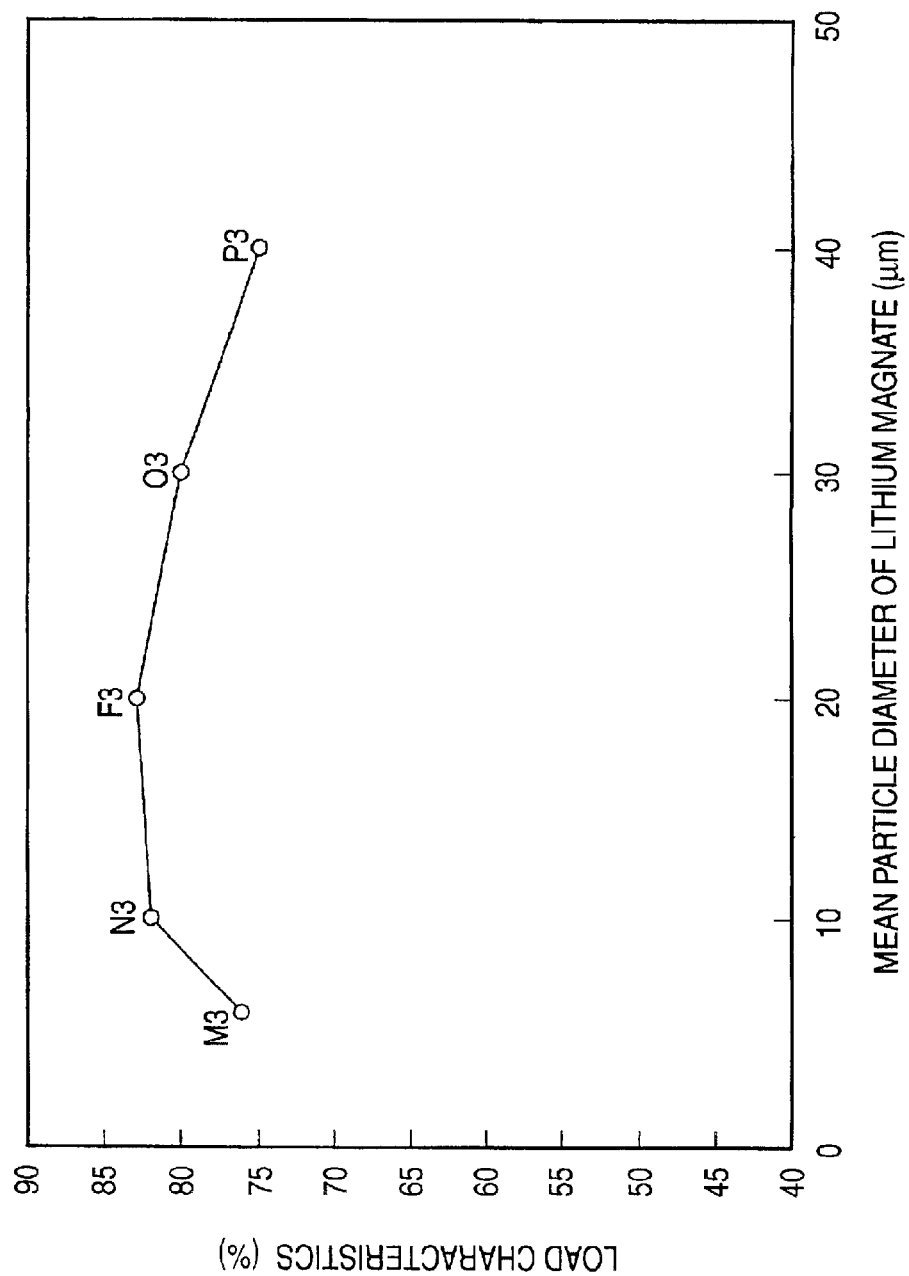
FIG. 5 shows a relation between the mean particle diameter of spinel type lithium manganate and the load characteristics.

From the results given in Table 4, a graph as shown in FIG. 5 was obtained by taking the mean particle diameter of spinel type lithium manganate as the abscissa and the load characteristics (%) as the ordinate. From the results shown in FIG. 5, it can be clearly understood that the load characteristics is improved in case the mean particle diameter B (μm) of spinel type lithium manganate falls in a range of 6 μm≦B≦40 μm, and that the load characteristics is further improved in case it falls in a range of 10 μm≦B≦30 μm.

In case the mean particle ratio (B/A) of spinel type lithium manganate and lithium cobaltate is fixed to 2 and the mean particle diameter of spinel type lithium manganate decreases to below 6 μm, presumably, the compressive force necessary for compressing the cathode mixed agent to a predetermined density increases because the particle diameter for both spinel type lithium manganate and lithium cobaltate is decreased. Since a high compression force is therefore applied to lithium cobaltate as a result, lithium cobaltate tends to become oriented as to lower the load characteristics.

In case the mean particle diameter of spinel type lithium manganate exceeds 40 μm, on the other hand, the surface area for both spinel type lithium manganate and lithium cobaltate is decreased due to the increase in mean particle diameter for both spinel type lithium manganate and lithium cobaltate, thereby resulting in reduced reaction area in contact with the electrolyte and in a drop in load characteristics.

As described above, in the invention, the cathode collector retains mixed cathode active material in such a manner that the mixing ratio of lithium cobaltate X thereof should fall in a range of $0.1 \leq X \leq 0.9$, that the bulk density Y (g/cm³) of the cathode mixed agent should be confined in a range satisfying the relation of $0.5X+2.7 \leq Y \leq 0.6X+3.3$, and that the mean particle diameter of spinel type lithium manganate should be greater than the mean particle diameter of lithium cobaltate. Accordingly, spinel type lithium manganate prevents lithium cobaltate particles from being oriented in parallel with the collector as to result in an improvement of permeability of the electrolyte and in an improvement of load characteristics such as high rate discharge properties.

In the embodiment of the invention, explanation has been made specifically on a case of using $Li_{1.07}Mn_{1.89}M_{0.04}O_4$ as the spinel type lithium manganate, but similar results can be obtained by using any spinel type lithium manganate having a composition expressed by $Li_{1+X}Mn_{2-Y}M_ZO_4$ (where M represents at least one type of element selected from the group consisting of B, Mg, Ca, Sr, Ba, Ti, V, Cr, Fe, Co, Ni, Cu, Al, In, Nb, Mo, W, Y, and Rh; $0.54 \leq ((1+X)+Z)/(2-Y) \leq 0.62$; $-0.15 \leq X \leq 0.15$; $Y \leq 0.5$; and $0 \leq Z \leq 0.1$). Among them, particularly excellent high temperature characteristics (such as cycle life characteristics at high temperature, storage characteristics at high temperature, and the like) can be obtained by preferably using those of Mg added systems or Al added systems.

Further, in the embodiment of the invention above, explanation has been made specifically on a case using $LiCoO_2$, however, similar results can be obtained in cases using those having a composition expressed by $LiCo_{1-X}M_XO_2$ (where M represents at least one type of element selected from the group consisting of B, Mg, Ca, Sr, Ba, Ti, V, Cr, Fe, Ni, Cu, Al, In, Nb, Mo, W, Y, and Rh, and $0 \leq X \leq 0.1$) as lithium cobaltate. Among them, particularly excellent discharge characteristics can be obtained by preferably using those of Cr added systems, Mn added systems, Al added systems, and Ti added systems.

What is claimed is:

1. A lithium secondary battery comprising a cathode containing a cathode active material capable of intercalating and deintercalating lithium ions, an anode containing an anode active material capable of intercalating and deintercalating lithium ions, and a non-aqueous electrolyte, wherein said cathode comprises, retained on a cathode collector, a cathode mixed agent based on a mixed cathode active material comprising a mixture of lithium cobaltate and a spinel type lithium manganate;

provided that the mixed cathode active material contains lithium cobaltate at a mass ratio X in a range of not lower than 0.1 but not higher than 0.9;

that the cathode mixed agent is retained on the cathode collector in such a manner that the bulk density Y (g/cm³) should fall in a range not lower than $0.5X+2.7$ but not higher than $0.6X+3.3$;

that the mean particle diameter of the spinel type lithium manganate is larger than the mean particle diameter of the lithium cobaltate;

that the mean particle diameter A of the lithium cobaltate and the mean particle diameter B of the spinel type lithium manganate are specified as such that the ratio B/A is 1.5 or larger but not larger than 8.0; and that the mean particle diameter of the spinel type lithium manganate is 6 µm or larger but not larger than 40 µm.

2. A lithium secondary battery as claimed in claim 1, wherein, the mean particle diameter A of the lithium cobaltate and the mean particle diameter B of the spinel type lithium manganate are specified as such that the ratio B/A should be 2.0 or larger but not larger than 5.0.

3. A lithium secondary battery as claimed in claim 1, wherein, the mean particle diameter of the spinel type lithium manganate is 10 µm or larger but not larger than 30 µm.

4. A lithium secondary battery comprising a cathode containing a cathode active material capable of intercalating and deintercalating lithium ions, an anode containing an anode active material capable of intercalating and deintercalating lithium ions, and a non-aqueous electrolyte, wherein said cathode comprises, retained on a cathode collector, a cathode mixed agent based on a mixed cathode active material comprising a mixture of lithium cobaltate and a spinel type lithium manganate;

provided that the mixed cathode active material contains lithium cobaltate at a mass ratio X in a range of not lower than 0.1 but not higher than 0.9;

that the cathode mixed agent is retained on the cathode collector in such a manner that the bulk density Y (g/cm³) should fall in a range not lower than $0.5X+2.7$ but not higher than $0.6X+3.3$.

that the mean particle diameter of the spinel type lithium manganate is larger than the mean particle diameter of the lithium cobaltate;

that the mean particle diameter A of the lithium cobaltate and the mean particle diameter B of the spinel type lithium manganate are specified as such that the ratio B/A is 1.5 or larger but not larger than 8.0; and that the mean particle diameter of the spinel type lithium manganate is 6 µm or larger but not larger than 40 µm;

wherein, the spinel type lithium manganate is expressed by a compositional formula of $Li_{1+X}Mn_{2-Y}M_ZO_4$ (where M represents at least one element selected from the group consisting of B, Mg, Ca, Sr, Ba, Ti, V, Cr, Fe, Co, Ni, Cu, Al, In, Nb, Mo, W, Y, and Rh; $0.54 \leq ((1+X)+Z)/(2-Y) \leq 0.62$; $-0.15 \leq X \leq 0.15$; $Y \leq 0.5$; and $0 \leq Z \leq 0.1$).

5. A lithium secondary battery comprising a cathode containing a cathode active material capable of intercalating and deintercalating lithium ions, an anode containing an anode active material capable of intercalating and deintercalating lithium ions, and a non-aqueous electrolyte, wherein said cathode comprises, retained on a cathode collector, a cathode mixed agent based on a mixed cathode active material comprising a mixture of lithium cobaltate and a spinel type lithium manganate;

provided that the mixed cathode active material contains lithium cobaltate at a mass ratio X in a range of not lower than 0.1 but not higher than 0.9;

that the cathode mixed agent is retained on the cathode collector in such a manner that the bulk density Y (g/cm³) should fall in a range not lower than $0.5X+2.7$ but not higher than $0.6X+3.3$;

that the mean particle diameter of the spinel type lithium manganate is larger than the mean particle diameter of the lithium cobaltate; that the mean particle diameter A of the lithium cobaltate and the mean particle diameter B of the spinel type lithium manganate are specified as such that the ratio B/A is 1.5 or larger but not larger than 8.0; and that the mean particle diameter of the spinel type lithium manganate is 6 $\mu$m or larger but not larger than 40 $\mu$m;

wherein M in the spinel type lithium manganate expressed by the formula $Li_{1+X}Mn_{2-Y}M_ZO_4$ is Al or Mg.

6. A lithium secondary battery comprising a cathode containing a cathode active material capable of intercalating and deintercalating lithium ions, an anode containing an anode active material capable of intercalating and deintercalating lithium ions, and a non-aqueous electrolyte, wherein said cathode comprises, retained on a cathode collector, a cathode mixed agent based on a mixed cathode active material comprising a mixture of lithium cobaltate and a spinel type lithium manganate;

provided that the mixed cathode active material contains lithium cobaltate at a mass ratio X in a range of not lower than 0.1 but not higher than 0.9;

that the cathode mixed agent is retained on the cathode collector in such a manner that the bulk density Y (g/cm$^3$) should fall in a range not lower than 0.5X+2.7 but not higher than 0.6X+3.3;

that the mean particle diameter of the spinel type lithium manganate is larger than the mean particle diameter of the lithium cobaltate; that the mean particle diameter A of the lithium cobaltate and the mean particle diameter B of the spinel type lithium manganate are specified as such that the ratio B/A is 1.5 or larger but not larger than 8.0; and that the mean particle diameter of the spinel type lithium manganate is 6 $\mu$m or larger but not larger than 40 $\mu$m;

wherein, the lithium cobaltate is expressed by a compositional formula of $LiCo_{1-X}M_XO_2$ (where M represents at least one element selected from the group consisting of B, Mg, Ca, Sr, Ba, Ti, V, Cr, Fe, Ni, Cu, Al, In, Nb, Mo, W, Y, and Rh, and $0 \leq X \leq 0.1$).

* * * * *